US006360828B1

(12) United States Patent
Chung

(10) Patent No.: US 6,360,828 B1
(45) Date of Patent: Mar. 26, 2002

(54) RETAINING DEVICE FOR A POWER DRILL SHAFT

(75) Inventor: Lee Hsin-Chih Chung, Taiwan (TW)

(73) Assignee: Chung, Lee H. (TW)

( * ) Notice: Subject to any disclaimer, the term of this patent is extended or adjusted under 35 U.S.C. 154(b) by 0 days.

(21) Appl. No.: 09/854,803

(22) Filed: May 14, 2001

(51) Int. Cl.[7] ................................................ B23B 45/00

(52) U.S. Cl. ...................... 173/93.5; 173/104; 173/171; 173/205; 173/213

(58) Field of Search ......................... 173/93, 93.5, 104, 173/205, 213, 216, 217, 171, 178

(56) References Cited

U.S. PATENT DOCUMENTS 2,684,738 A * 7/1954 Kaplan ...................... 173/93.5
4,215,594 A * 8/1980 Workman, Jr. et al. ..... 173/178
4,619,162 A * 10/1986 Van Leare .................. 173/104
5,083,619 A * 1/1992 Giargino et al. ........... 173/93.5
5,538,089 A * 7/1996 Sanford ........................ 173/26
5,908,076 A * 1/1999 Marcengill et al. ......... 173/205
6,035,947 A 3/2000 Chung ........................ 173/93.5

* cited by examiner

*Primary Examiner*—Scott A. Smith
(74) *Attorney, Agent, or Firm*—Ostrolenk, Faber, Gerb & Soffen, LLP

(57) ABSTRACT

A retaining device for a power drill has multiple brake shoes movably received in the housing, a cam securely engaged with the output shaft to selectively abut the brake shoes to move and engage with an inner periphery of a through hole and a driving disk provided to drive the output shaft and to limit the movement of the brake shoes in the housing. When the brake shoes are moved to engage with the inner periphery defining the through hole, a locking effect is provided to the driving disk so as to the output shaft.

12 Claims, 4 Drawing Sheets

RETAINING DEVICE FOR A POWER DRILL SHAFT

FIELD OF THE INVENTION

The present invention relates to a retaining device, and more particularly to a retaining device for a power drill shaft. The retaining device enables to lock the power drill shaft so that when electricity is not provided to the power drill, the power drill is able to be operated manually.

BACKGROUND OF THE INVENTION

An electrical tool, such as an electric drill, normally is powered by electricity from an electrical outlet or a rechargeable battery. However, no matter which kind of power the power drill is used, once the electricity is off due to a power failure or a battery malfunction, the power drill is useless. Somehow, even when the power is off, the worker still has to catch up the schedule. Under such a situation, the worker will have to manually operate the power drill. When manually operating the power drill, because the driving gear of the motor shaft is directly mated with a gear assembly and the gear assembly is then mated with the driven gear, the driven gear will drive the motor shaft to rotate simultaneously, which causes the bit or the screw driver mounted on the front of the power drill to be unable to fulfill the desired goal.

Furthermore, when changing the bit of the power drill, the worker will have to use a clutch key to rotate the clutch which is mounted directly with the output shaft of the power drill, so that the worker will have to use one hand to firmly hold the head of the clutch and the other hand to rotate the clutch key, which causes a great deal of inconvenience to the worker.

To overcome the shortcomings, the present invention intends to provide an improved retaining device to mitigate or obviate the aforementioned problems.

SUMMARY OF THE INVENTION

The primary objective of the invention is to provide a retaining device for a power drill shaft. The retaining device has multiple brake shoes selectively driven by a driving disk, such that when the power is off, the brake blocks will be driven by a cam operated by an output shaft to lock the power drill shaft.

Another objective of the invention is that the outer faces of the brake shoes have patterns, so that when the brake shoes abut the inner face of the housing for receiving the brake shoes, the friction between the brake shoes and the inner face of the housing is increased so as to provide a good braking effect to the output shaft of the power shaft.

Other objects, advantages and novel features of the invention will become more apparent from the following detailed description when taken in conjunction with the accompanying drawings.

DETAILED DESCRIPTION OF PREFERRED EMBODIMENT

Figure 1:
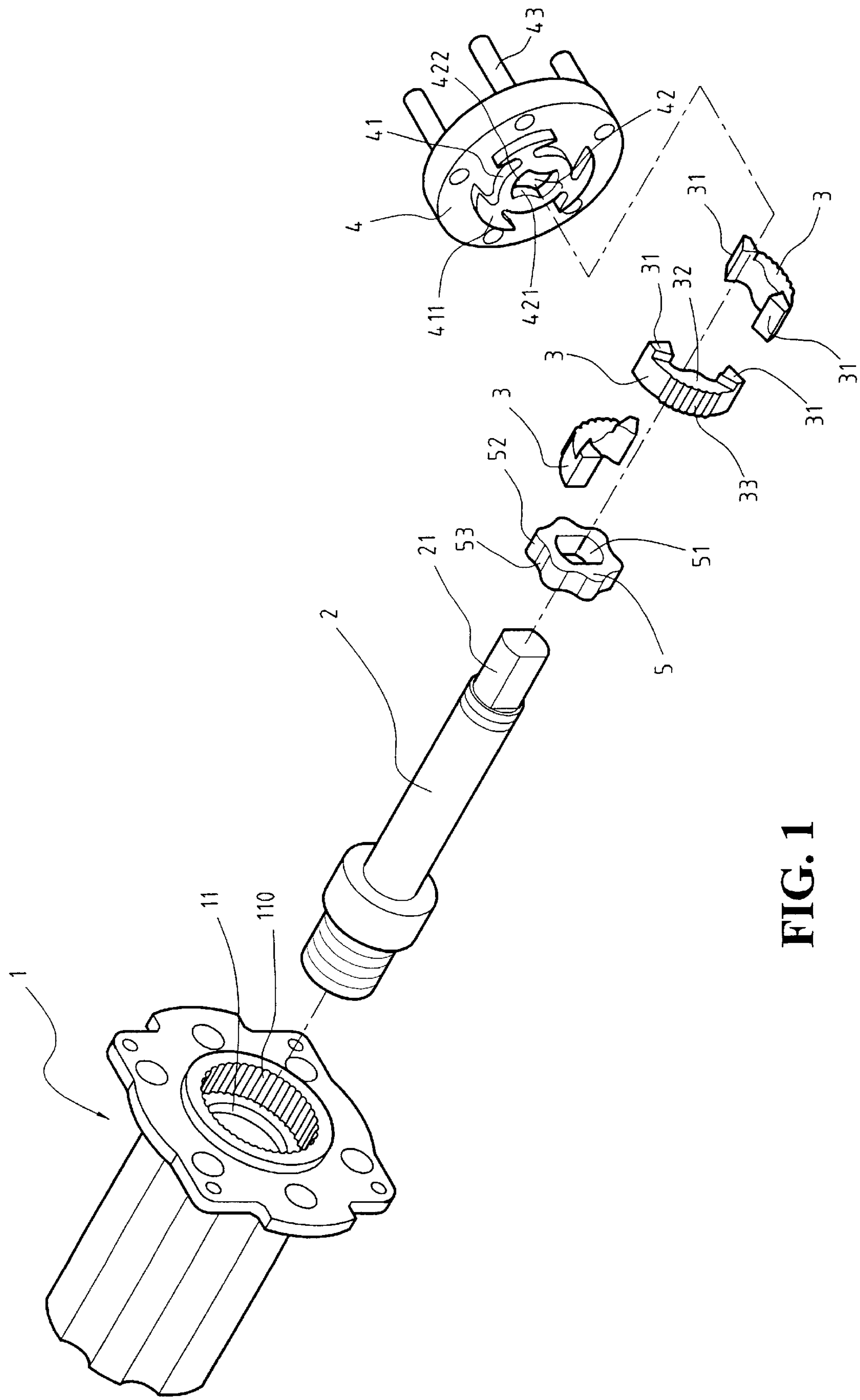
FIG. 1 is an exploded perspective view of the retaining device in accordance with the present invention.
Figure 2:
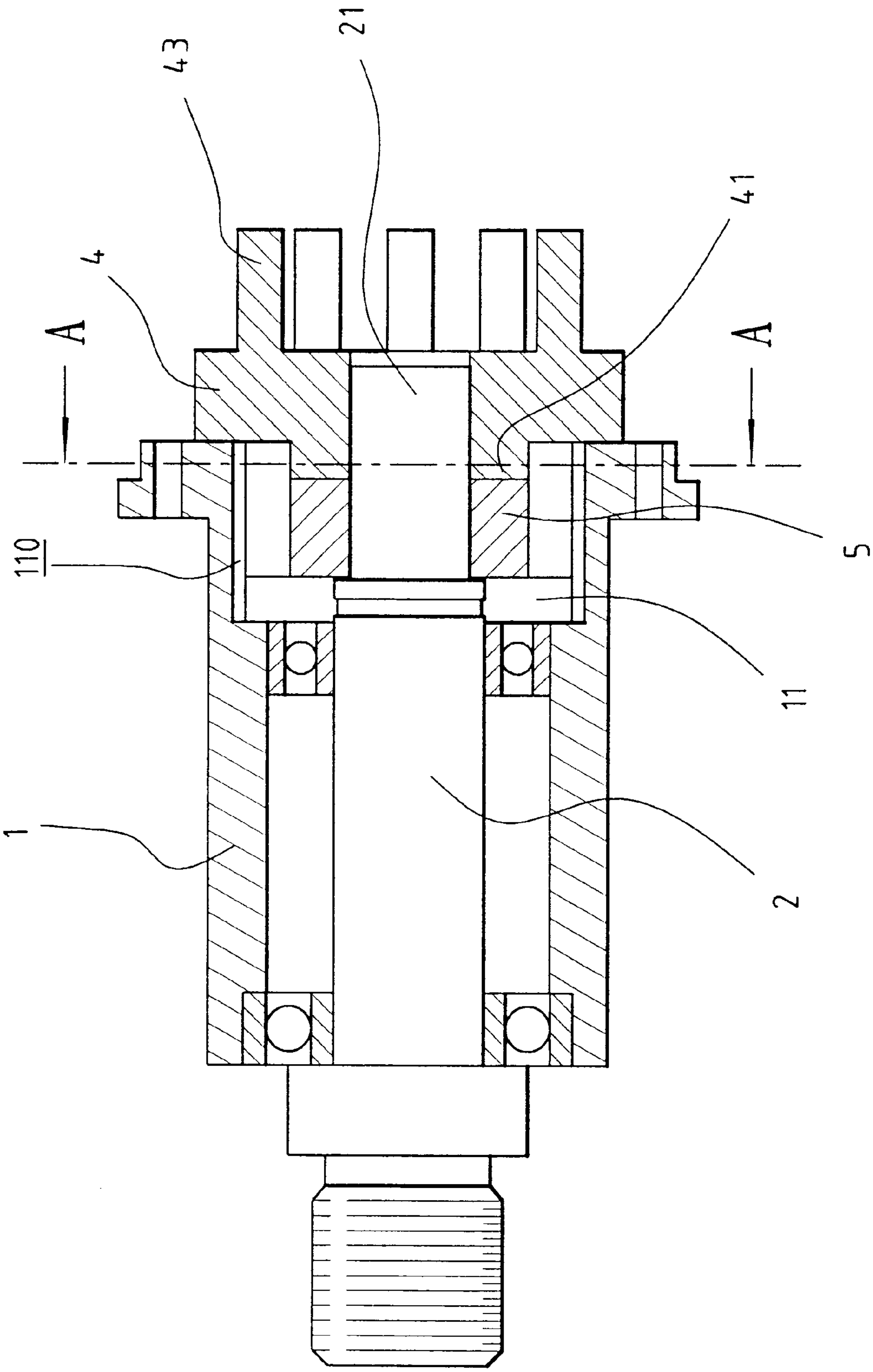
FIG. 2 is a cross sectional view of the assembled retaining device of the present invention.

With reference to FIGS. 1 and 2, a retaining device in accordance with the present invention has a housing 1, an output shaft 2, brake shoes 3, a driving disk 4 and a cam 5.

The housing 1 has a centrally defined through hole 11 and a first pattern 110 formed on an inner face defining the through hole 11.

The output shaft 2 is rotatably received inside the housing 1 and has a truncated section 21. The cam 5 is securely mounted on the truncated section 21 so as to rotate simultaneously with the output shaft 2 and has a hole 51 corresponding to the truncated section 21, multiple ridges 52 formed on an outer periphery of the cam 5 and multiple troughs 53 each formed between two adjacent ridges 52.

The brake shoes 3 are arcuate and are so received in the through hole 11 of the housing 1 that outer peripheries of the brake shoes 3 form a contour substantially corresponding to the inner periphery defining the through hole 11. Each brake shoe 3 has two wedged protrusions 31 respectively formed on opposite ends of the brake shoe 3 to correspond to two adjacent troughs 53 of the cam 5 and an extension 32 formed between the two wedged protrusions 31. The brake shoe 3 further has a second pattern 33 formed on the outer periphery to correspond to the first pattern 110.

The driving disk 4 is provided to drive the output shaft 2 to rotate and has a circular protrusion 41 with elongated stops 411 integrally extending out from the circular protrusion 41, a central hole 42 defined to correspond to the truncated section 21 of the output shaft 2 and having a neck 421 formed on a mediate portion of the sidewall defining the central hole 42 and a sectorial area 422 defined in both ends of the neck 421 and multiple poles 43 formed oppositely to the circular protrusion 41 to be assembled with a gear assembly (not shown). It is to be noted that a length of each elongated stop 411 is smaller than a distance between two wedged protrusions 31.

Figure 3:
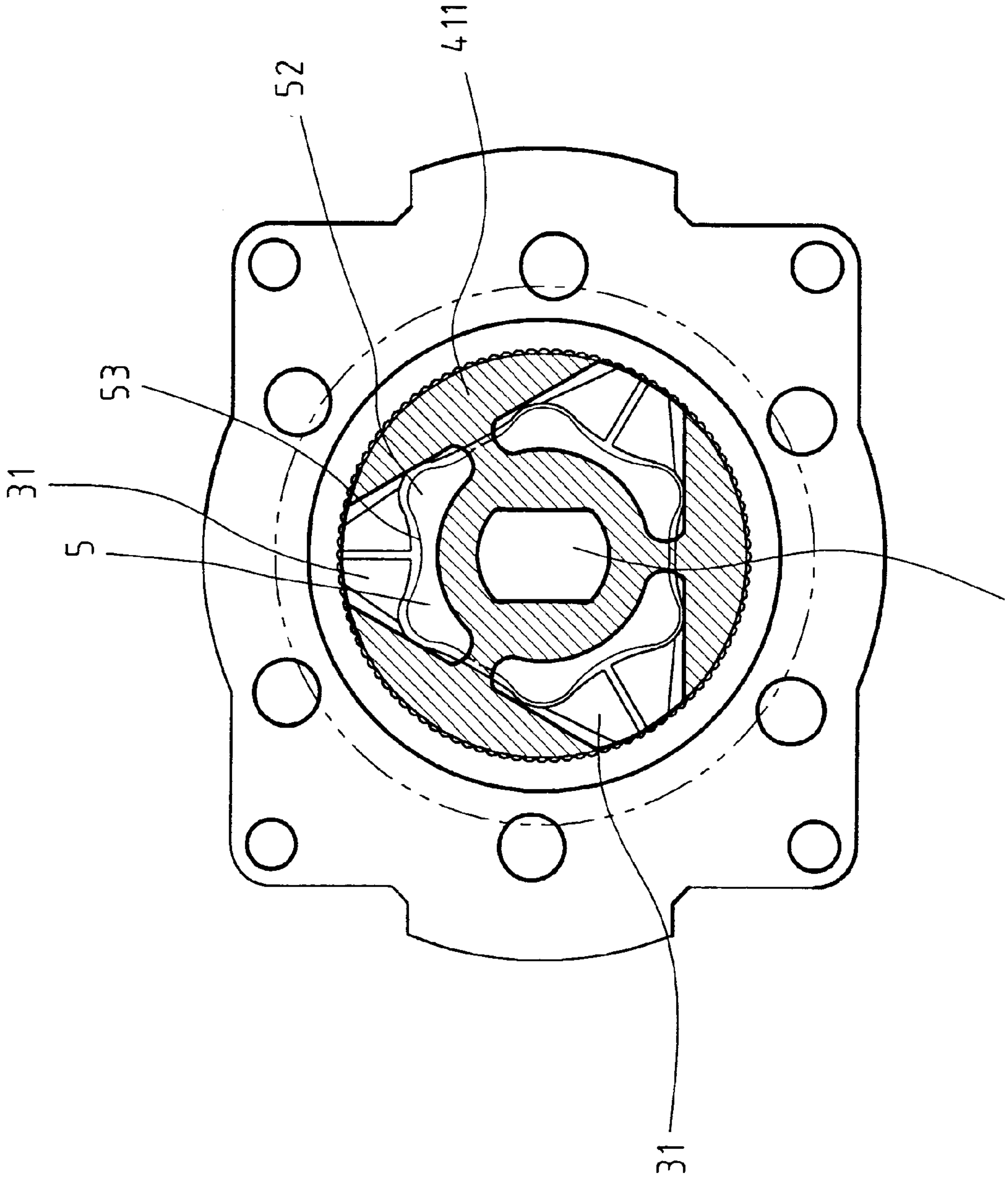
FIG. 3 is a cross sectional view of the retaining device along line A—A of FIG. 2.
Figure 4:
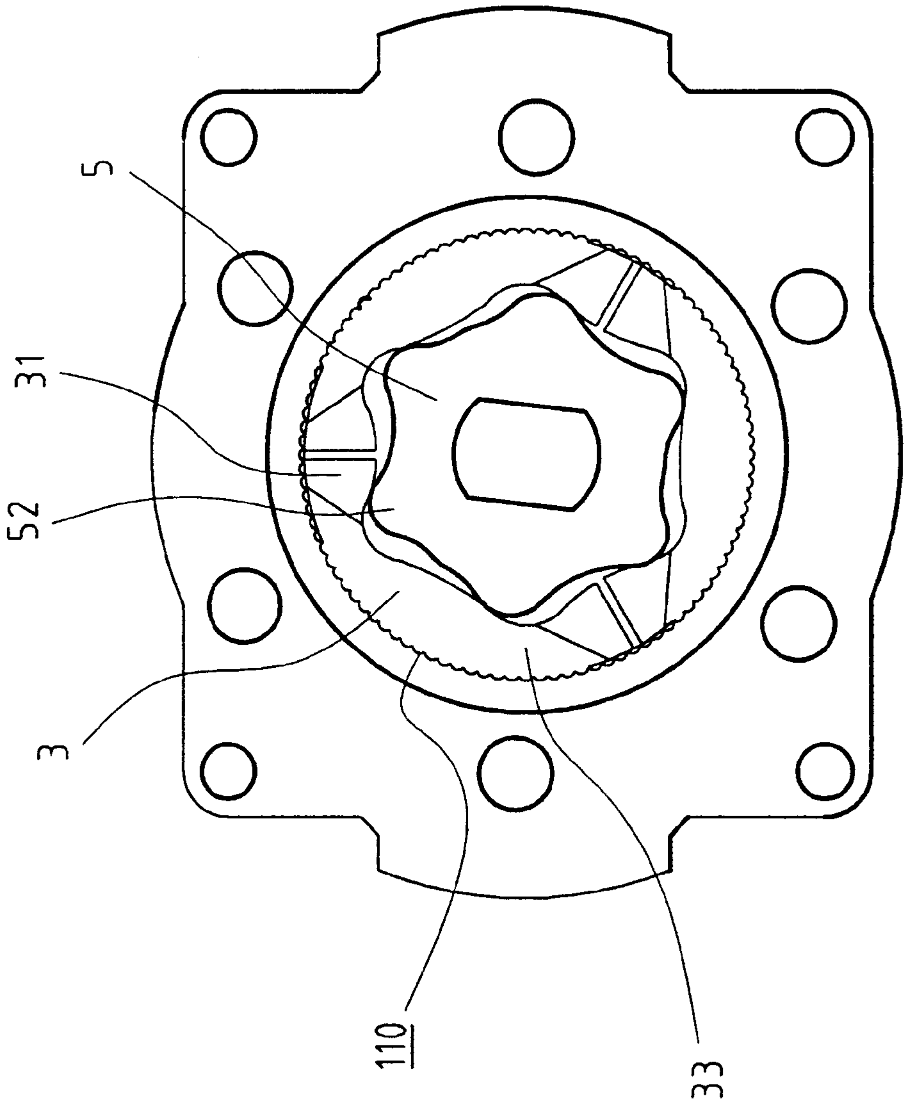
FIG. 4 is an operational side plan view of the movement of the brake shoes when the output shaft rotates.

When in assembly, as shown in FIGS. 3 and 4, the truncated section 21 of the output shaft 2 extends through the hole 51 of the cam 5 and the central hole 42 of the driving disk. After the brake shoes 3 are received in the through hole 11 of the housing 1, each elongated stop 411 is received between two wedged protrusions 31 of each brake shoe 3. Furthermore, the movement angle of the truncated section 21 of the output shaft 2 within the two sectorial areas 422 is larger than the movement angle of the elongated stop 411 between two wedged protrusions 31 of the brake shoe 3. With such an arrangement, the rotation of the driving disk 4 allows the elongated stops 411 to engage the wedged protrusions 31 first.

Therefore, when the driving disk 4 rotates, because the two ends of the elongated stop 411 are close to the two wedged protrusions 31 of the brake shoe 3, the two ends of the elongated stop 411 limit the movement of the brake shoe 3 so as to maintain the outer peripheries of each of the brake shoes disengage with the periphery defining the through hole 11 of the housing 1. Accordingly, the output shaft 2, the brake shoes 3 and the cam 5 to rotate simultaneously due to the rotation of the driving disk 4.

When the power is off and the power drill is operated manually, the output shaft 2 drives the cam 5 to rotate. The ridges 52 push the extensions 32 of the brake shoes 3 so that the brake shoes 3 move outward to engage with the periphery defining the through hole 11. That is, the second pattern 33 engages with the first pattern 110 of the housing 1 (as shown especially in FIG. 4) to provide a lock effect to the driving disk 4. Therefore, the power drill is able to be operated manually.

What is claimed is:

1. A retaining device for a power drill, the retaining device comprising:

a hollow housing with a through hole defined therethrough;

an output shaft rotatably received in the through hole and having a truncated section formed on a distal end extending out from the through hole of the housing;

a cam having a hole defined to correspond to the truncated section to rotate with the output shaft and having ridges formed on an outer periphery and troughs each formed between two adjacent ridges;

brake shoes movably received in the through hole of the housing and each having two wedged protrusions respectively formed on two opposite ends of the brake shoe to be received in two adjacent troughs of the cam and an extension formed between the two wedged protrusions to be selectively engaged with one of the ridges of the cam;

a driving disk for driving the output shaft and having a central hole defined to receive the truncated section therethrough, a circular protrusion with elongated stops each received between two wedged protrusions of one of the brake shoes to limit the movement of the brake shoes and poles formed to be adapted to be assembled with gears.

2. The retaining device as claimed in claim 1, wherein an inner periphery defining the through hole of the housing has a first pattern and each outer periphery of the brake shoes has second pattern formed to correspond to the first pattern so that when the brake shoes are moved by the ridges of the cam to abut the inner periphery defining the through hole, the engagement between the first pattern and the second pattern provides a locking effect to the driving disk.

3. The retaining device as claimed in claim 2, wherein the central hole has a neck formed on a mediate portion of the central hole and two sectorial areas defined on opposite portions of the neck to allow the truncated section to move in a limited angle.

4. The retaining device as claimed in claim 3, a length of each elongated stop is smaller than a distance between two wedged protrusions.

5. The retaining device as claimed in claim 4, a movement angle of the truncated section of the output shaft within the two sectorial areas is larger than a movement angle of the elongated stop between two wedged protrusions of the brake shoe.

6. The retaining device as claimed in claim 3, a movement angle of the truncated section of the output shaft within the two sectorial areas is larger than a movement angle of the elongated stop between two wedged protrusions of the brake shoe.

7. The retaining device as claimed in claim 2, a length of each elongated stop is smaller than a distance between two wedged protrusions.

8. The retaining device as claimed in claim 7, a movement angle of the truncated section of the output shaft within the two sectorial areas is larger than a movement angle of the elongated stop between two wedged protrusions of the brake shoe.

9. The retaining device as claimed in claim 2, a movement angle of the truncated section of the output shaft within the two sectorial areas is larger than a movement angle of the elongated stop between two wedged protrusions of the brake shoe.

10. The retaining device as claimed in claim 1, a length of each elongated stop is smaller than a distance between two wedged protrusions.

11. The retaining device as claimed in claim 10, a movement angle of the truncated section of elongated stop between two wedged protrusions of the brake shoe.

12. The retaining device as claimed in claim 1, a movement angle of the truncated section of the output shaft within the two sectorial areas is larger than a movement angle of the elongated stop between two wedged protrusions of the brake shoe.

* * * * *